(12) United States Patent
Wang et al.

(10) Patent No.: US 10,050,645 B2
(45) Date of Patent: Aug. 14, 2018

(54) JOINT ENCRYPTION AND ERROR CORRECTION ENCODING

(71) Applicant: HEWLETT PACKARD ENTERPRISE DEVELOPMENT LP, Houston, TX (US)

(72) Inventors: Han Wang, Houston, TX (US); Joseph E. Foster, Houston, TX (US); Raghavan V. Venugopal, Houston, TX (US); Patrick A. Raymond, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 78 days.

(21) Appl. No.: 15/114,501

(22) PCT Filed: Jan. 30, 2014

(86) PCT No.: PCT/US2014/013819
§ 371 (c)(1),
(2) Date: Jul. 27, 2016

(87) PCT Pub. No.: WO2015/116097
PCT Pub. Date: Aug. 6, 2015

(65) Prior Publication Data

US 2016/0344428 A1    Nov. 24, 2016

(51) Int. Cl.
*H03M 13/00* (2006.01)
*G09C 1/00* (2006.01)
*H04L 9/06* (2006.01)
*G06F 11/10* (2006.01)
*H04L 1/00* (2006.01)

(52) U.S. Cl.
CPC ............ *H03M 13/63* (2013.01); *G06F 11/10* (2013.01); *G09C 1/00* (2013.01); *H04L 1/0042* (2013.01); *H04L 9/0631* (2013.01); *H04L 2209/04* (2013.01); *H04L 2209/34* (2013.01)

(58) Field of Classification Search
CPC .......... H03M 13/63; G06F 11/10; G09C 1/00; H04L 1/0042; H04L 9/0631; H04L 2209/04; H04L 2209/34
USPC ....... 714/763, 768, 769, 773, 752, 786, 799, 714/800, 805
See application file for complete search history.

(56) References Cited

U.S. PATENT DOCUMENTS 7,219,237 B1    5/2007  Trimberger
7,392,404 B2 *  6/2008  Montgomery .......... G06F 21/79
                                                           710/10

(Continued)

OTHER PUBLICATIONS

Adamo, O.B., "Joint Schemes for Physical Layer Security and Error Correction," (Research Paper), Diss. University of North Texas, Aug. 2011, 93 pages, available at http://citeseerx.ist.psu.edu/viewdoc/download?doi=10.1.1.469.7910&rep=rep1&type=pdf.

(Continued)

*Primary Examiner* — John J Tabone, Jr.
(74) *Attorney, Agent, or Firm* — Trop, Pruner & Hu, P.C.

(57) ABSTRACT

A technique includes jointly encrypting and error encoding plain text data. The joint encryption and error encoding includes processing plain text data in an encryption cipher comprising a plurality of successive rounds to generate cipher text data; and embedding error correction encoding in the encryption cipher to error correction encode the cipher text data.

15 Claims, 4 Drawing Sheets

(56) References Cited

U.S. PATENT DOCUMENTS

| | | | |
|---|---|---|---|
| 7,966,488 B2* | 6/2011 | Apostolopoulos | H04L 29/06 380/210 |
| 8,045,584 B2* | 10/2011 | Apostolopoulos | H04L 29/06027 370/473 |
| 8,341,429 B2 | 12/2012 | Buckingham et al. | |
| 9,104,610 B2* | 8/2015 | Weingarten | G06F 12/1408 |
| 9,417,951 B2* | 8/2016 | Adikari | G06F 11/10 |
| 9,742,438 B2* | 8/2017 | Adikari | H03M 13/09 |
| 2003/0012372 A1 | 1/2003 | Cheng | |
| 2004/0123132 A1* | 6/2004 | Montgomery | G06F 21/79 726/20 |
| 2006/0002550 A1 | 1/2006 | Campagna et al. | |
| 2007/0036353 A1 | 2/2007 | Reznik et al. | |
| 2008/0192928 A1 | 8/2008 | Yu et al. | |
| 2009/0041236 A1* | 2/2009 | Gligoroski | H04L 9/065 380/43 |
| 2010/0202608 A1* | 8/2010 | Furuhashi | H04L 9/0894 380/44 |
| 2010/0266122 A1 | 10/2010 | Suzaki et al. | |
| 2011/0225432 A1 | 9/2011 | Trichina | |
| 2013/0051556 A1* | 2/2013 | Myung | H04L 9/00 380/252 |
| 2013/0142329 A1 | 6/2013 | Bell et al. | |
| 2015/0178146 A1* | 6/2015 | Adikari | G06F 11/10 714/48 |
| 2016/0344409 A1* | 11/2016 | Adikari | G06F 11/10 |

OTHER PUBLICATIONS

Cam, H. et al., "A Combined Encryption and Error Correction Scheme: AES-Turbo," Journal of Electrical & Electronics Engineering 1, 2009, pp. 861-866, available at http://ee.istanbul.edu.tr/eng/jeee/main/pages/issues/is91/91012.pdf.

Gupta, C.P, et al., "Joint AES Encryption and LDPC Coding," International Journal of Scientific & Engineering Research, vol. 4, Issue 7, Jul. 2013, 4 pages, available at http://www.ijser.org/researchpaper%5CJoint-AES-Encryption-and-LDPC-Coding.pdf.

International Search Report & Written Opinion received in PCT Application No. PCT/US2014/013819, dated Sep. 25, 2014, 13 pages.

Kak, S.C. et al., "Joint Encryption and Error-Correction Coding," (Research Paper), 1983 IEEE Symposium on Security and Privacy, 1983, 2 pages, available at http://dl.acm.org/citation.cfm?id=830514&CFID=254522307&CFTOKEN=35529530.

Mao, Q. et al., "Joint Error Correction and Encryption Scheme Based on Turbo Codes," (Research Paper), Intelligence Information Processing and Trusted Computing (IPTC), 2010 International Symposium on, IEEE, Oct. 28-29, 2010, pp. 503-506, available at http://longjisun.yolasite.com/resources/Joint%20Error%20Correction%20and%20Encryption%20Scheme%20Based%20on%.

Chetan N. Mathur, "A Mathematical Framework for Combining Error Correction and Encryption," Apr. 10, 2006, 86 pages <http://citeseerx.ist.psu.edu/viewdoc/download?doi=10.1.1.323.8622&rep=rep1&type=pdf>.

Christopher Jason Peikert, "Cryptographic Error Correction," Jul. 2006, 71 pages <https://pdfs.semanticscholar.org/7a2c/ae4a8dd92d1871ab6a703372342f228ce53a.pdf>.

Henk van Tilborg, "Error-correcting codes and Cryptography," May 11-12, 2011, 45 pages <http://www.win.tue.nl/cccc/cbc/slides/Henk-van-Tilborg.pdf>.

Mathur et al., "High Diffusion Cipher: Encryption and Error Correction in a Single Cryptographic Primitive," Jun. 2006, In ACNS, vol. 3989, pp. 309-324, <http://personal.stevens.edu/~ksubbala/Publications/cnm-kn-kps-acns.pdf>.

* cited by examiner

JOINT ENCRYPTION AND ERROR CORRECTION ENCODING

BACKGROUND

Data may be communicated over a channel (a data communication channel that includes one or multiple buses of a server, for example), which may be unreliable. For example, a given channel may be relatively noisy and introduce errors in bits of data, which are communicated over the channel. To communicate data over such a channel reliably, forward error correction encoding may be applied to the data at the transmission end of the channel; and at the receiving end of the channel, the data may be decoded for purposes of detecting any errors in the data as well as possibly correcting these errors. One type of forward error correction encoding uses error correction codes (ECCs) that are appended to the data and contain parity information.

DETAILED DESCRIPTION

Figure 1:
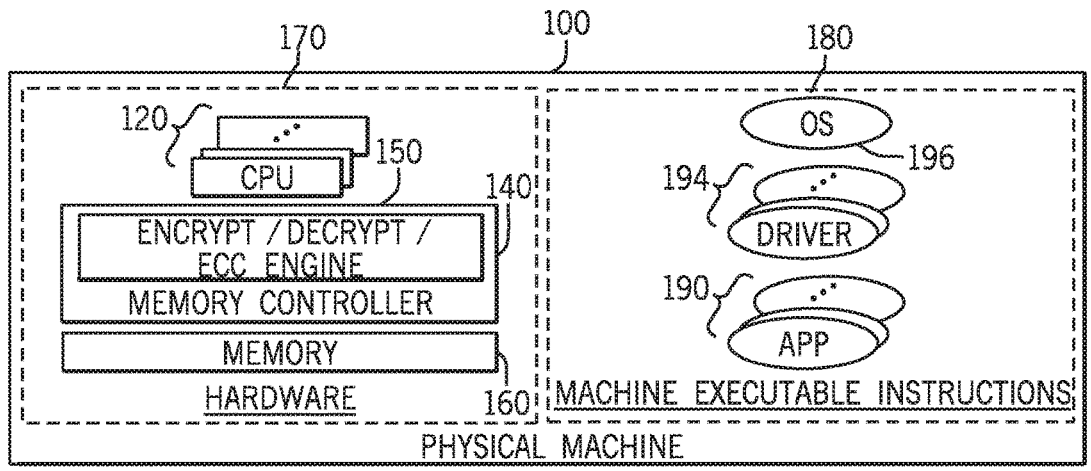
FIG. 1 is a schematic diagram of a physical machine according to an example implementation.

Data to be communicated across a given communication channel may be encrypted for purposes of securing the data against unauthorized access. As an example, the encryption (applied at the transmitting end of the channel) and decryption (applied at the receiving end of the channel) may follow the Advanced Encryption Standard (AES) ciphers that are described in Federal Information Processing Standards (FIPS) Publication 197 (Nov. 26, 2001).

For purposes of fulfilling demands for critical low latency data access, a modern computer system (a service system, a super computer cluster or a data center, as examples) may have an in-memory database, as compared to older databases that primarily rely on mass storage devices. In general, the computer system may use measures to enhance the reliability, availability and serviceability (RAS) of this in-memory database. For example, the computer system may employ encryption and decryption, to protect the in-memory data. At the same time, the computer system may use error correction encoding and decoding to accommodate hard and soft memory errors and avoid costly down time.

In general, in accordance with example implementations, the data stored in the computer system's memory may be both encrypted and error correction encoded; and when the data is retrieved from the memory (for application processing, for example) the data may be decrypted and error decoded. In the following discussion, unencrypted, or decrypted, data is referred to as "plain text data," and encrypted data is referred to as "cipher text data." In general, a "cipher" is an algorithm that is applied for purposes of encrypting plain text data to produce cipher text or decrypting cipher text data to produce plain text data.

One potential way to encrypt and error encode data is to first encrypt plain text data to produce cipher text data and subsequently, perform error correction encoding on the cipher text data to produce encoded, cipher text data. This technique may, however, publically expose some parts of the error correction redundancy, which presents security concerns. Another way to encrypt and error encode data is to first perform error correction encoding on the plain text data to produce encoded plain text data and then perform encryption on the encoded plain text data to produce encoded, cipher text data. This technique may, however, present challenges when the encryption has a diffusion transformation because encryption diffusions may propagate errors (errors in noisy data, for example) to the extent that the error correction decoding may be unable to handle the relatively large number of errors.

Techniques and systems are disclosed herein that 1). perform joint encrypting and error correction encoding of plain text data to produced encoded cipher text data; and 2.) perform joint decryption and error correction decoding of the encoded cipher text data back into the decoded, plain text data. Among potential advantages of performing the error and encryption operations jointly, error correction redundancy is not exposed and the operations are less sensitive to noisy data. More specifically, systems and techniques are disclosed herein, which embed, or interleave, the encryption and error correction encoding; and also interleave the decryption and the error correction decoding.

Referring to FIG. 1, in accordance with example implementations that are disclosed herein, the above-described cryptography and error correction operations are performed by an engine 150, which is part of a memory controller 140 of a physical machine 100. In accordance with example implementations, the engine 150 is constructed to perform encryption and decryption; and the engine 150 is constructed to interleave error correction encoding and error correction decoding with the encryption and decryption, respectively. More specifically, in accordance with example implementations, the engine 150 encrypts and error correction encodes data for purpose of storing the data in memory 160 of the machine (in response to write operations, for example); and the engine 150 decrypts and error correction decodes data stored in the memory 160 for purposes of retrieving the data from the memory 160 (in response to read operations, for example).

It is noted that the engine 150 is one of many potential entities that may perform cryptography and error correction operations, in accordance with an example implementation. The engine 150 may, as examples, be formed from hardware, hardwired logic, a processing unit that executes machine executable instructions (or "software"), or a combination of one or more of these components, depending on the particular implementation. Moreover, another software or hardware entity may perform the cryptography and error correction operations that are disclosed herein, in accordance with further example implementations.

As examples, the physical machine 100 may be a desktop computer, a laptop, a tablet, a client, a server, a smart phone, and so forth, depending on the particular implementation. Moreover, although FIG. 1 depicts the physical machine 100 as being contained in a single box or rack, the machine 100 may have a distributed architecture and as such, may be formed from components that are disposed at multiple locations, in accordance with example implementations. Thus, the physical machine 100 that is depicted in FIG. 1 is merely an example, as the physical machine 100 may have many architectures, in accordance with other implementations.

In general, the physical machine 100 is an actual machine that is made up of actual hardware 170, such as the memory controller 140, the memory 160, and actual machine executable instructions (or "software") 180. As depicted in FIG. 1, the hardware 170 may further include one or multiple central processing units (CPUs) 120, and each CPU 120 may include one or multiple processing cores. Moreover, each CPU 120 may include an associated memory controller, with the memory controller 140 being a specific example.

The memory 160 represents non-transitory storage for the physical machine 100 and may be, as examples, semiconductor device-based storage (a memory formed from dynamic random access (DRAM) devices, for example); memristor device-based storage; optical storage; non-volatile memory devices; volatile memory devices or a combination of one or more of these features, depending on the particular implementation. In general, the machine executable instructions 180, when executed by the CPU(s) 120 may form various software components for the physical machine 100, such as (as examples), applications 190, an operating system 196 and operating system drivers 194. The instructions 180, in general, may be at least temporarily stored in a memory, such as the memory 160, for purposes of execution.

In accordance with example implementations, the memory 160 may store data (in encrypted and error correction encoded form) for an in-memory data base; and the execution of the machine executable instructions 180 may generate read and write requests, which are handled by the memory controller(s) (such as memory controller 140) of the physical machine 100 for purposes of storing data in and retrieving data from the memory 160.

Figure 2:
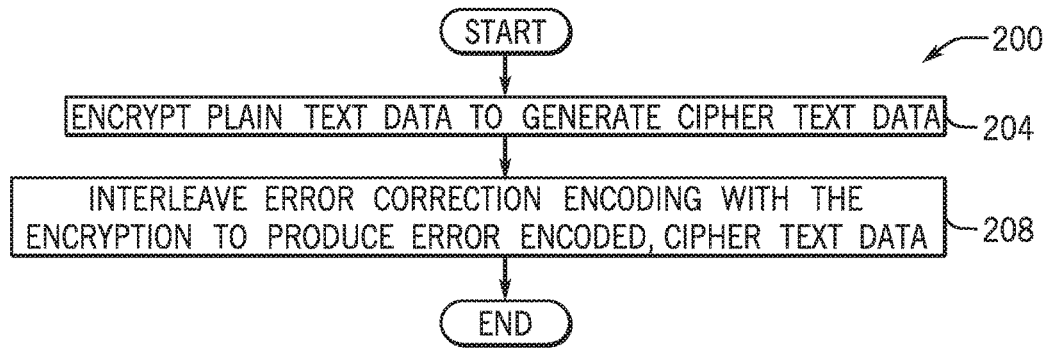
FIG. 2 is a flow diagram depicting a technique to jointly encrypt and error correction encode data according to an example implementation.

In accordance with example implementations, the engine 150 may perform a technique 200 that is depicted in FIG. 2 for purposes of preparing data (data that is associated with a write request, for example) before the data is stored in the memory 160. Referring to FIG. 2 in conjunction with FIG. 1, pursuant to the technique 200, the engine 150 encrypts (block 204) plain text data to generate cipher text data and embeds, or interleaves (block 208), error correction encoding with the encryption for purposes of producing error correction encoded, cipher text data.

Figure 3:
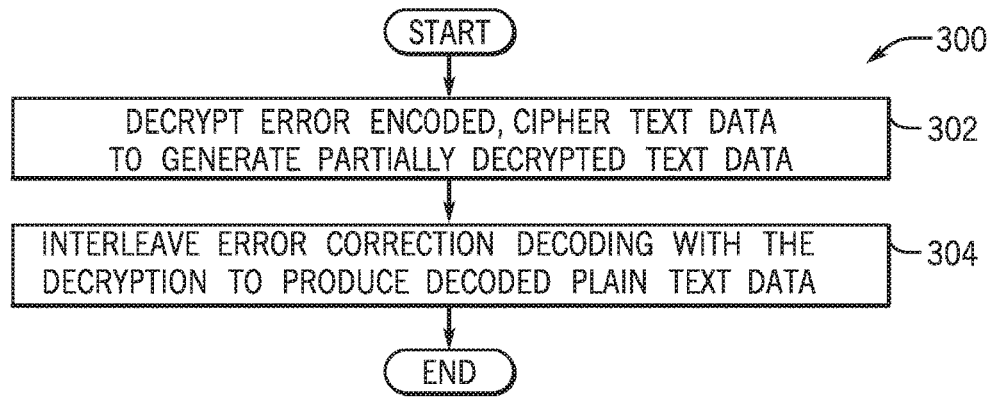
FIG. 3 is a flow diagram depicting a technique to jointly decrypt and error correction decode data according to an example implementation.

The engine 150 may perform a technique 300 that is depicted in FIG. 3 for purposes of preparing data (data that is targeted by a read request, for example) that is retrieved from the memory 160. Referring to FIG. 3 in conjunction with FIG. 1, pursuant to the technique 300, the engine 150 decrypts (block 302) cipher text data to generate partially decrypted text data and interleaves (block 304) error correction decoding with the decryption to produce decoded, plain text data.

For the following example implementations, the engine 150 applies encryption and decryption ciphers, which are modified versions (as further described herein) of the cryptography ciphers that are described in the Advanced Encryption Standard (AES) that is published in (FIPS) Publication 197 (Nov. 26, 2001) for purposes of interleaving error correction encoding and decoding with the ciphers.

Figure 4:
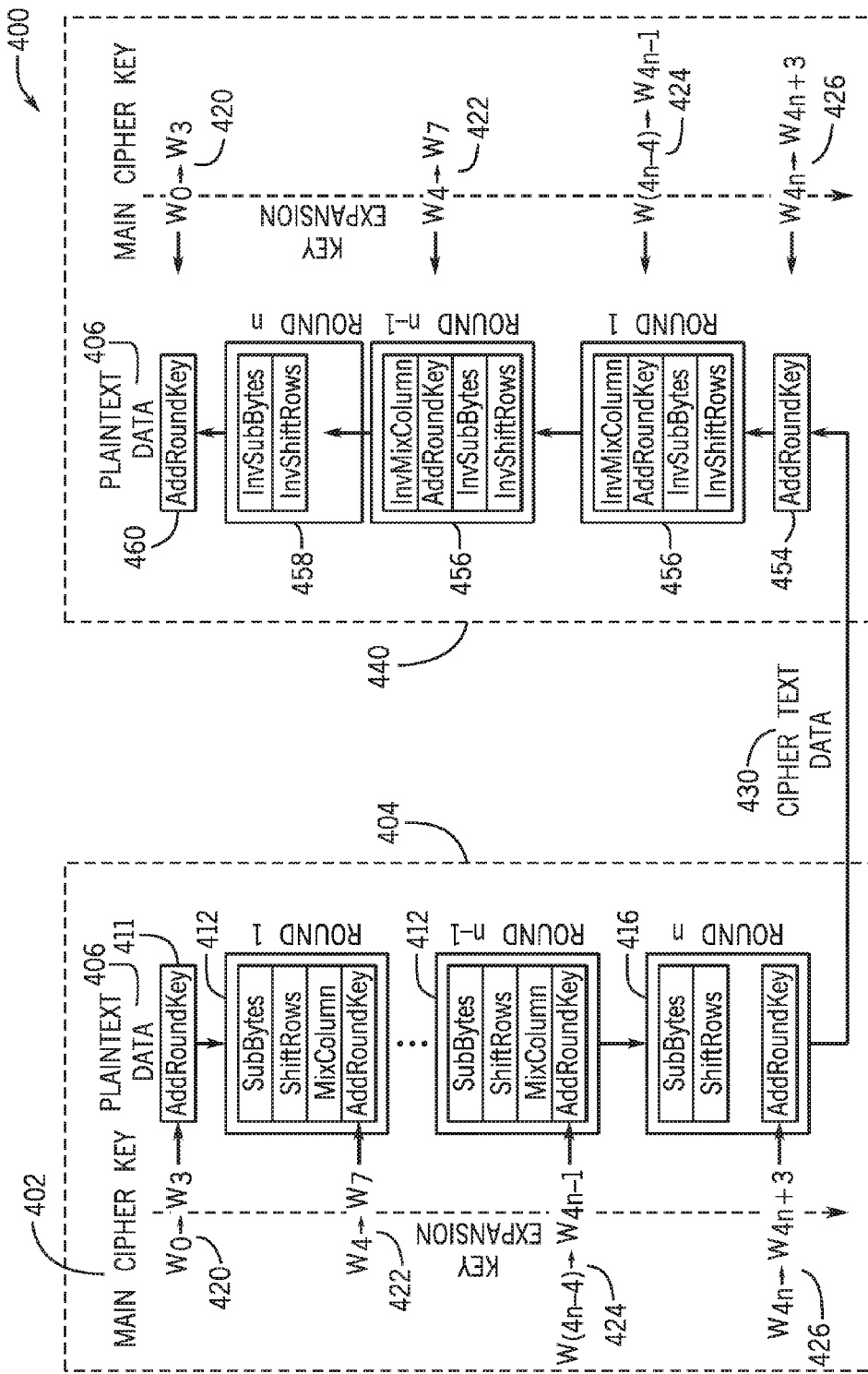
FIG. 4 is an illustration of Advanced Encryption Standard (AES)-based ciphers for encrypting and decrypting data.

FIG. 4 is an illustration 400 of AES-based encryption 404 and decryption 440 ciphers that do not employ error correction encoding and decoding. Referring to FIG. 4, in general, the AES-based encryption/decryption ciphers is a process in which data is processed in "rounds," and the number of rounds depends on the length of a main cipher key 402. The rounds of the decryption cipher 440 contain transformations which are inverse versions of the transformations of the encryption cipher 404. The transformations of the encryption cipher 404 and the inverse transformations of the decryption cipher 440 are briefly described below for purposes clarifying the embedding the error correction encoding and decoding, which are discussed in FIGS. 5 and 6. A more detailed explanation of the transformations and inverse transformations, as well as a more detailed discussion of the overall AES encryption and decryption ciphers, may be found in FIPS Publication 197.

The encryption cipher 404 includes an initial round 41, which processes plaintext data 406. As further described herein, the plaintext data 406 may have a predetermined block size, such that encryption ciphers similar to the one depicted in FIG. 4 may be applied to different subblocks of a given block of plain text data. The initial round 411 is followed by n−1 intermediate rounds 412. In each of the intermediate rounds 412, four transformations (described below) are applied. The intermediate rounds 412 are followed by a final round 416 in which three transformations (described below) are applied. As depicted in FIG. 4, for the various rounds, the main cipher key 402 is expanded and applied the encryption rounds involve the use of a main cypher key, which is expanded for use with the next round. In this manner, the main cipher key 420 in its initial form is used in the first round 411, and the main cipher key is progressively expanded for subsequent rounds, as depicted by cipher keys 422, 424 and 426.

In general, the initial round 411 applied an AddRoundKey transformation, which involves exclusive ORing the plain text 406 data block and the main cipher key 402. The resulting data is sequentially processed in the n−1 intermediate rounds 412. Each intermediate round 412 includes four transformations: a SubBytes transformation, a ShiftRows transformation, a MixColumn transformation and an AddRoundKey transformation, which successively process the data in the order depicted in FIG. 4.

The SubBytes transformation is an operation for executing a non-linear conversion by dividing the received data. The ShiftRows transformation is an operation that rearranges the data block on a byte basis. The MixColumn transformation is an operation that diffuses the data. The MixColumn transformation divides the data block into sub blocks and performs a matrix conversion on each of the sub blocks. The AddRoundKey transformation exclusively ORs the data with the expanded cipher key.

The final round 416 provides cipher text data 430, i.e., the end product of the encryption cipher 404. Similar to the intermediate rounds 412, the last round 416 has the SubBytes, ShiftRows and AddRoundKey transformations, which process the data in the order that is depicted in FIG. 4. However, unlike the intermediate rounds 412, the final round 416 does not contain the MixColumn transformation.

The decryption cipher 440 converts the cipher text data 430 into the plaintext data 406 beginning with an initial round 454 and ending with a final round 460, in the order depicted in FIG. 4. The rounds of the decryption cipher include AddRoundKey transformations (its own inverse), which exclusively ORs the data with progressively contracted cipher keys 426, 424, 422 and so forth, such that the AddRoundKey transformation in the final round 460 uses the original main cipher key 420, as depicted in FIG. 4.

More specifically, as depicted in FIG. 4, the initial round 454 of the decryption cipher 440 includes the AddRoundKey transformation, which exclusively ORs the cipher text data 430 with the cipher key 426. The initial round 454 is proceeded by n−1 intermediate rounds 456; an nth round 458 and then the final round 460.

Each intermediate round 456 includes four transformations: InvShiftRows, InvSubBytes, AddRoundkey and InvMixColumns, which are successively applied in this order, as depicted in FIG. 4. The InvShiftRows, InvSubBytes and InvMixColumn transformations are inverses of the ShiftRows, SubBytes and MixColumn transformations, respectively. The last round 458 includes the InvShiftRows and InvSubBytes transformations, as depicted in FIG. 4.

In accordance with example implementations, the error correction encoding/decoding by the engine 150 (see FIG. 1) uses error correction code (ECC)-based parity codewords, which may be, as examples, any block ECC-based codewords, such as popular RS, BCH, extended Hamming codes (SEC-DED), LOTE-ECC, Turbo, LDPC, convolution code, and so forth. Moreover, in accordance with example implementations, the engine 150 embeds the ECC encoding and decoding with AES-based encryption and decryption ciphers, respectively.

Figure 5:
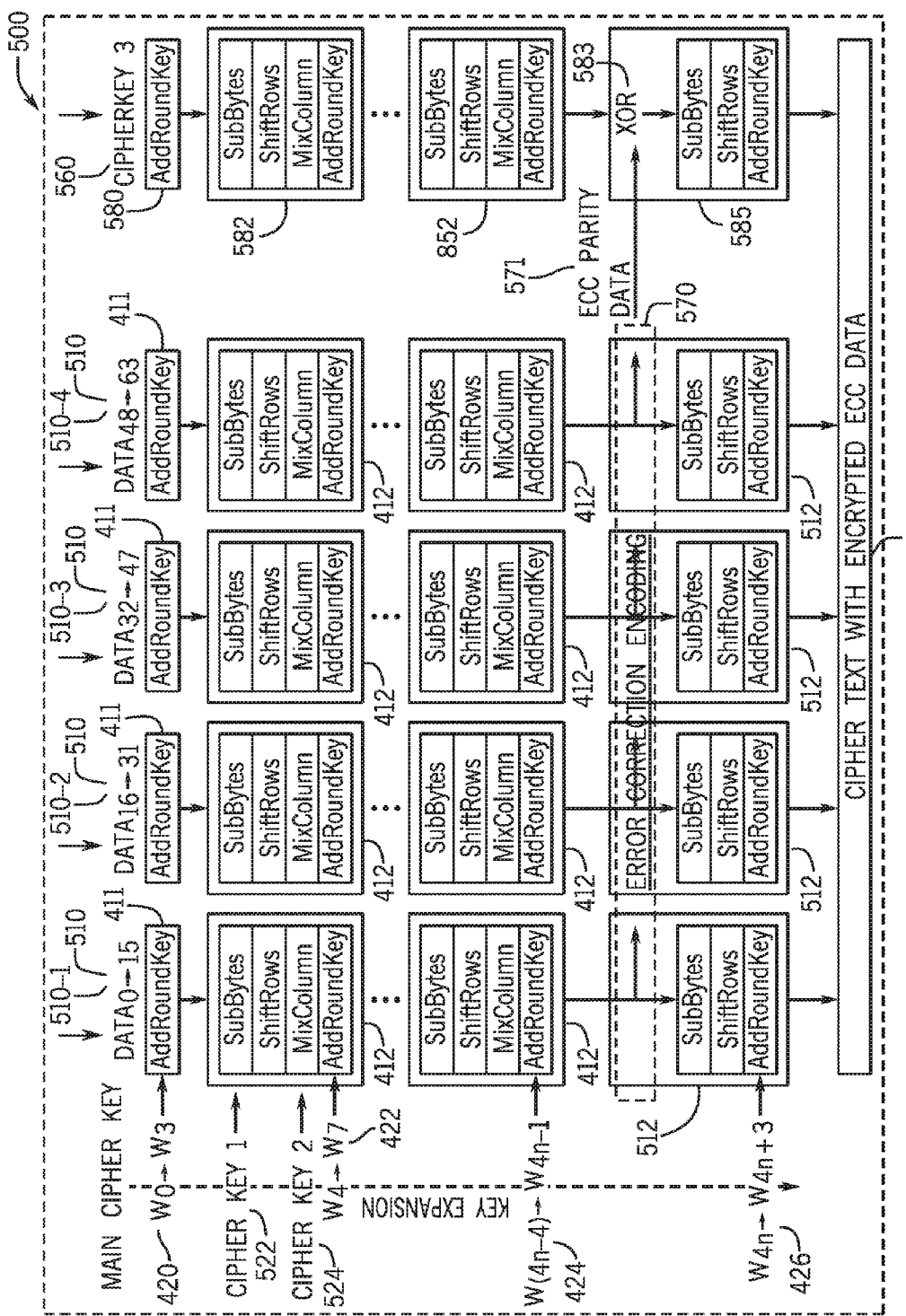
FIG. 5 is an illustration of a cipher to jointly encrypt and error correction encode data according to an example implementation.

As a more specific example, in accordance with example implementations, the engine 150 uses an encryption cipher 500 that is depicted FIG. 5 for purposes of jointly encrypting and ECC encoding data. Referring to FIG. 5, the cipher 500 processes blocks 510-1, 510-2, 510-3 and 510-4 of plain text data 510 through respective sets of encryption ciphers. In accordance with example implementations, each of these encryption ciphers, which processes the blocks has elements similar to the AES-based encryption cipher 404 of FIG. 4, with similar reference numerals being used to denote these elements. Unlike the encryption cipher 404 of FIG. 4, however, the final round 416 of the cipher 404 is replaced with a final round 512, which embeds ECC encoding within the encryption.

More specifically, similar to the final round 416, the final round 512 contains the SubBytes, ShiftRows and AddRoundKey transformations. Unlike the final round 416, the final round 512 includes an ECC encoding component. In this manner, ECC encoding 570 is applied across the final rounds 512 before the SubBytes transformations of the final round 512 to produce ECC parity data 571 that is indicative of ECC parity codewords. Due to the ECC encoding 570, the encryption process 500 produces cipher text with encrypted ECC data, as indicated at reference numeral 590.

Thus, the encryption/ECC encoding in accordance with example implementations, decomposes the AES encryption into several processing sections that operate on different blocks of the plain text data 510 and adds an ECC encoding in the last round 516 of each of these processing sections before the SubBytes, RowShift and AddRoundKey transformations. The SubBytes, RowShift and AddRoundKey transformations do not cause error propagation issues for the substituted-shifted-masked ECC codewords, because these transformations do not diffuse the data (like the MixColumn transformation, for example), and as such the transformations do not change any error weight or total error numbers that may be present in the data due to, for example, a noisy channel.

In accordance with example implementations, the encrypted ECC parity data has an inner mark and an outer mask by exclusive ORing (as depicted at reference numeral 583) the inner mask (generated from a third long cipher key 560) with the ECC parity data 571 and then applying the outer mask. More specifically, the inner mask is introduced by the processing of the third long cipher key 560, though successive rounds 580 and 582 as depicted in FIG. 5, which use the main cipher key 420 and its expanded versions for the corresponding AddRoundKey transformations. The initial round 580 contains an AddRoundKey transformation, and the rounds 582 each contains SubBytes, ShiftRows, MixColulmn and AddRoundKey transformations in that order, as depicted in FIG. 5. The length of the third long cipher key 560 is dependent on the parity length (a multiple number of 16 bytes, for example). The outer mask is introduced by round 585 that includes SubBytes, RowShift, and AddRoundKey transformations that are applied in that order, as depicted in FIG. 5.

The third long cipher key 560 (Cipher key 1) allows arbitrary SubBytes mapping. This feature allows customization of the engine 150 for various customers, in accordance with example implementations. The third cipher key 560 may be changed/programmed using a basic input/output operating system (BIOS) of the physical machine 100, for example.

Figure 6:
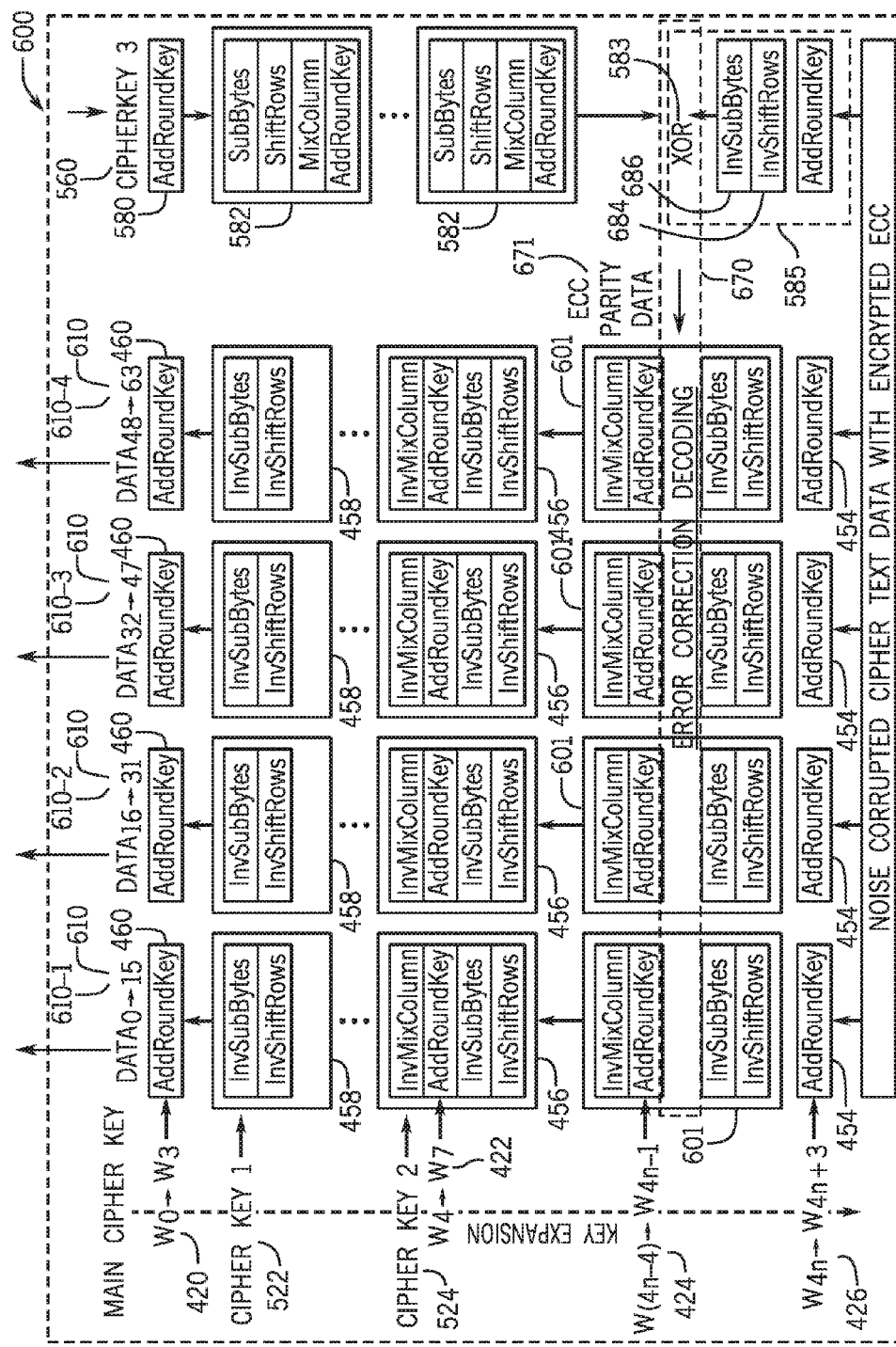
FIG. 6 is an illustration of a cipher to jointly decrypt and error correction decode data according to an example implementation.

FIG. 6 depicts a decryption cipher 600 that may be used by the engine 150 to jointly decrypt and decode data, in accordance with example implementations. The cipher 600 generates blocks 610-1, 610-2, 610-3 and 610-4 of decoded, plain text data 610 through respective sets of decryption ciphers. In accordance with example implementations, each of these decryption ciphers, which processes the blocks has elements similar to the AES-based decryption cipher 440 of FIG. 4, with similar reference numerals being used to denote these elements. Unlike the decryption cipher 440 of FIG. 4, however, the round 456 of the cipher 440 is replaced with a round 601, which embeds ECC decoding with the decryption.

More specifically, the round 601 is similar to the round 456, except that the ECC decoding 670 is applied across the rounds using ECC parity data 671. Thus, for the decryption, the InvRoundKey, InvRowShift and InvSubBytes transformations are applied to unmask, vice shift and vice substitute back to the ECC codewords, respectively. The decryption is temporarily suspended in the round 601 so that the ECC decoding 670 may be applied to illuminate error patterns and deliver an error-free intermediate cipher text for the rest of the decryption process 600.

As depicted in FIGS. 5 and 6, in accordance with example implementations, the MixColumn transformation uses four bytes to perform a constant matrix multiplication transformation. The MixColumn transformation introduces a new transformation including more bytes to further introduce the diffusions and also enhance the confusion by integrating a second long cipher key 524 into the transformation.

The inverse process uses the non-linear polynomial interpolation over the large Galois Field with information seeds from the hash function for the second cipher key. Depending on the round as well as the bytes that are incorporated into the transformation, the second cipher key may have the ultra-long length overpassing the current AES cipher length of 128 bits, 192 bits, 256 bits. The brutal force attack, statistical attack and differential and linear attacks are computationally unfeasible.

The solution extends the security level by introducing the third manufacture long cipher key 560 into the SubBytes transformation to perform arbitrary SubBytes mapping. This feature allows customization of the engine 150 for various customers, in accordance with example implementations. The key may be changed using firmware and the basic input/output operating system (BIOS) to send a command to change the decryption engine, which may destroy the data retrieval without performing an expensive full data clear up.

Other implementations are contemplated, which are within the scope of the appended claims. For example, as described herein, in accordance with example implementations, the error correction encoding 570 (see FIG. 5) generates parity, also referred to as "systematic encoding" in coding theory. However, in accordance with further example implementations, the error correction encoding may be a non-systematic encoding, whose code words represent a confusion of data with redundancy. This provides a degree of extra security if a larger block size of code word is introduced. For example, if the data "1234" is ECC encoded in a systematic way, the resulting data may be as follows: "1234567," where the "567" represents the parity information. However, if the "1234" data is encoded in a non-systematic way, then the resulting data may be as follows: "*&^$ !@#".

While the present techniques have been described with respect to a limited number of embodiments, those skilled in the art, having the benefit of this disclosure, will appreciate numerous modifications and variations therefrom. It is intended that the appended claims cover all such modifications and variations as fall within the true spirit and scope of the present techniques.

What is claimed is:

1. A method comprising:
   with a hardware memory controller, jointly encrypting and error encoding plain text data to generate cipher text data, comprising:
   processing, with the hardware memory controller, the plain text data with an encryption cipher comprising a plurality of successive rounds, the plurality of successive rounds including a final round; and
   with the hardware memory controller, interleaving error correction encoding within the encryption cipher prior to a stage of the final round associated with a linear substitution to error correction encode the generated cipher text data.

2. The method of claim 1, wherein at least one of the plurality of successive rounds other than the final round comprises a diffusion transformation.

3. The method of claim 1, wherein interleaving the error correction encoding comprises performing error correction encoding in the final round before a SubBytes transformation in the final round.

4. The method of claim 1, wherein processing the plain text data with an encryption cipher comprises using multiple long keys.

5. The method of claim 1, wherein the error correction encoding generates parity codewords, the method further comprising:
   generating a first mask based at least in part on a cipher key; and
   exclusive ORing the parity codewords with the first mask.

6. The method of claim 5, further comprising:
   processing a result of the exclusive ORing with a second mask.

7. A method comprising:
   with a hardware memory controller, processing cipher text data with a decryption cipher comprising a plurality of successive rounds to generate plain text data; and
   in the decryption cipher, extracting error correction data for the plain text data with the hardware memory controller during a temporary suspension of inverse transformations in one of the plurality of successive rounds.

8. The method of claim 7, wherein the plurality of successive rounds comprise a first round in which a cipher key is exclusively ORed with input data for the first round and a second round to receive an output from the first round, and the extracting comprises performing the extracting in the second round.

9. The method of claim 8, wherein the second round comprises an inverse diffusion transformation.

10. The method of claim 7, wherein processing the cipher text data and extracting the error correction data comprise performing the processing and extracting in a memory controller.

11. The method of claim 7, wherein the plurality of successive rounds includes a final round, and wherein extracting error correction data further comprises extracting the error correction data prior to an InbSubBytes transformation in the final round.

12. An apparatus comprising:
    a memory; and
    a hardware memory controller to store encoded cipher text data in the memory, the hardware memory controller comprising:
    an engine to process plain text data with an encryption cipher comprising a plurality of successive rounds having a final round and interleave error correction encoding within the encryption cipher prior to a stage of the final round associated with a linear substitution to generate the encoded cipher text data.

13. The apparatus of claim 12, wherein the engine generates the encoded cipher text data in response to a write request associated with the plain text data.

14. The apparatus of claim 12, wherein the engine, in response to a read request, decrypts and decodes the encoded cipher text data stored in the memory.

15. The apparatus of claim 12, wherein the stage of the final round associated with the linear substitution is a SubBytes transformation stage.

* * * * *